(12) United States Patent
Iriyama

(10) Patent No.: US 7,318,905 B2
(45) Date of Patent: Jan. 15, 2008

(54) DECORATIVE SHEET FOR IN-MOLD DECORATING INJECTION MOLDING, DECORATIVE MOLDING AND IN-MOLD DECORATING INJECTION MOLDING METHOD

(75) Inventor: Hideyuki Iriyama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 155 days.

(21) Appl. No.: 11/288,345

(22) Filed: Nov. 29, 2005

(65) Prior Publication Data

US 2006/0071366 A1 Apr. 6, 2006

Related U.S. Application Data

(62) Division of application No. 09/778,096, filed on Feb. 7, 2001, now Pat. No. 7,001,659.

(30) Foreign Application Priority Data

Feb. 10, 2000 (JP) ............................. 2000-33315

(51) Int. Cl.
*B29C 45/14* (2006.01)
(52) U.S. Cl. ...................... 264/266; 264/275
(58) Field of Classification Search .............. None
See application file for complete search history.

(56) References Cited

U.S. PATENT DOCUMENTS 4,410,595 A  10/1983  Matsumoto et al.
4,939,009 A * 7/1990  Beavers et al. ............ 428/35.2
4,948,654 A  8/1990  Brooks et al.
5,616,418 A  4/1997  Vasselin et al.
6,336,988 B1  1/2002  Enlow et al.
6,416,866 B1  7/2002  Atake et al.

FOREIGN PATENT DOCUMENTS

| EP | 0 311 079 | 4/1989 |
|---|---|---|
| EP | 0 385 887 | 9/1990 |
| JP | 43-27488 B | 12/1943 |
| JP | 5-19132 | 7/1975 |
| JP | 54-132675 A | 10/1981 |
| JP | 57-105310 A | 6/1982 |
| JP | 3-139542 | 6/1991 |
| JP | 4-135716 | 5/1992 |

(Continued)

*Primary Examiner*—Edmund H. Lee
(74) *Attorney, Agent, or Firm*—Oliff & Berridge, PLC

(57) ABSTRACT

A decorative sheet (S) for in-mold decorating injection molding has a base sheet (1A) and a resin layer (2) formed on a surface of the base sheet (1A) to be brought into contact with an injection-molded molding and containing an acrylic-modified polyolefin resin. The acrylic-modified polyolefin resin is a resin composed by grafting-copolymerizing an acrylic monomer and/or an acrylic prepolymer on principal chains of a polypropylene resin. The decorative sheet (S) includes, for example, a base sheet (1A) of an acrylic resin, a decorative layer (3) of a binder resin and at least either an acrylic resin contained in the binder resin or a polyvinyl chloride-acetate resin, and a bonding layer (2) containing an acrylic-modified polyolefin resin. A primer layer (4) may be sandwiched between the bonding layer (2) and the decorative layer (3).

6 Claims, 2 Drawing Sheets

FOREIGN PATENT DOCUMENTS

| | | |
|---|---|---|
| JP | 11-34247 | 2/1999 |
| JP | 11-091041 A | 4/1999 |
| JP | 11-245261 A | 9/1999 |
| JP | 11-277695 A | 10/1999 |
| WO | WO 99/43485 | 9/1999 |

\* cited by examiner

DECORATIVE SHEET FOR IN-MOLD DECORATING INJECTION MOLDING, DECORATIVE MOLDING AND IN-MOLD DECORATING INJECTION MOLDING METHOD

This is a Division of application Ser. No. 09/778,096 filed Feb. 7, 2001 now U.S. Pat. No. 7,001,659. The entire disclosures of the prior application are hereby incorporated by reference in their entirety.

BACKGROUND OF THE INVENTION

1. Field of the Invention

The present invention relates to a laminated decorative sheet for in-mold decorating injection molding, an in-mold decorating injection molding method using the laminated decorative sheet, and a decorative molding decorated with the laminated decorative sheet.

2. Description of the Related Art

Decorative moldings formed by decorating the surfaces of resin moldings have been used for various purposes. In-mold decorating injection molding methods are disclosed in, for example, JP-B No. Sho 50-19132 and JP-A No. Hei 11-91041. An in-mold decorating injection molding method carries out operations for forming a resin molding and bonding a decorative sheet to the surface of the resin molding simultaneously to produce a decorative molding having a decorative surface. Generally, such an in-mold decorating injection molding method uses acrylic resins, ABS resins, polystyrene resins and the like. A decorative sheet for in-mold decorating injection molding consists of a base sheet of an acrylic resin, an ABS resin or a polystyrene resin, and a pattern layer of an ink or an adhesive. The adhesive layer is formed of a styrene resin, an acrylic resin a polyvinyl chloride-acetate resin or the like.

ABS resins are used generally for forming, for example, automotive interior furnishings by injection molding. Because of the high cost of ABS resins and recent increasing concern for environmental problems, demand for using polypropylene resins including propylene copolymers instead of ABS resins has increased.

Decorative sheets for in-mold decorating injection molding proposed in Jpn. Pat. No. 2923281 and JP-A No. Hei 11-277695 have an adhesive layer formed of a chlorinated polypropylene resin that is adhesive to polypropylene resins and polyolefin resins.

Although a chlorinated polypropylene resin having a higher chlorine content and bonded to polypropylene resins by thermal bonding has a lower adhesive strength, the chlorinated polypropylene resin has bad solubility and bad compatibility and a coating liquid or an ink of the chlorinated polypropylene is unable to form an adhesive layer or the like by coating or printing unless the same is not chlorinated. A chlorinated polypropylene resin having a chlorine content of 30% by weight has minimum heat resistance. In a practical in-mold decorating injection molding process, the adhesive strength of an adhesive layer is reduced by a high process temperature. Consequently, a decorative sheet for in-mold decorating injection molding is liable to be separated from a solidified resin molding formed by injection molding by an external force that acts thereon when ejecting a decorative molding from a mold. Therefore, measures must be taken to prevent the separation of the decorative sheet from the resin molding.

When a decorative sheet of an acrylic resin capable of serving also as a protective layer for a decorative molding is used, the decorative sheet is heated and drawn in a preforming process for preforming the decorative sheet so as to conform to the molding surface of a mold, and then the decorative sheet is cooled rapidly. Consequently, a stress induced in the decorative sheet by drawing remains in the decorative sheet and contractile force is produced in the decorative sheet when the decorative sheet is heated again at a temperature near to the glass transition point of the decorative sheet. Thus, the adhesive strength of an adhesive layer of a conventional chlorinated polypropylene resin yields to the contractile force of the decorative sheet of the acrylic resin having a thickness in the range of 100 to 200 µm at temperatures around 100° C. and the decorative sheet creases or peels off. Therefore, the heat resistance of, for example, automotive interior furnishings provided with an acrylic resin sheet is not satisfactory in a working environment.

SUMMARY OF THE INVENTION

Accordingly, it is an object of the present invention to provide a decorative sheet for in-mold decorating injection molding, capable of satisfactorily adhering to resin moldings, particularly, polyolefin resin moldings with which most decorative sheets have difficulty in adhering thereto, in a hot state (in in-mold decorating injection molding and in using products). Another object is to provide an in-mold decorating injection molding method capable of adhesively bonding a decorative sheet to a molding of a resin, particularly of a polyolefin resin, in satisfactorily firm adhesion in a hot state, and to provide a decorative molding.

According to the present invention, a decorative sheet for in-mold decorating injection molding, to be adhesively bonded to an injection-molded resin molding includes a base sheet, and a resin layer formed on a surface of the base sheet to be brought into contact with the injection-molded resin molding, and containing an acrylic-modified polyolefin resin.

The resin layer of an acrylic-modified polyolefin resin as an adhesive for bonding the decorative sheet to an injection-molded molding bonds the decorative sheet in satisfactory adhesion in a hot state during in-mold decorating injection molding for forming an injection-molded decorative molding and during the use of the injection-molded decorative molding to the injection-molded molding of a polyolefin resin with which most decorative sheets have difficulty in being bonded thereto. The injection-molded resin molding may be formed of an inexpensive polyolefin resin, such as a polypropylene resin.

According to the present invention, the acrylic-modified polyolefin resin is a resin composed by grafting-copolymerizing at least an acrylic monomer and/or an acrylic prepolymer on the principal chains of a polypropylene resin.

Adhesion in a hot state can be further ensured when the injection-molded resin molding is formed of a polyolefin resin, such as a polypropylene resin.

In the decorative sheet according to the present invention for in-mold decorating injection molding, the resin layer containing an acrylic-modified polyolefin resin is a bonding layer capable of adhering to the injection-molded resin molding.

In the decorative sheet according to the present invention for in-mold decorating injection molding, a decorative layer is sandwiched between the base sheet and the bonding layer.

In the decorative sheet according to the present invention for in-mold decorating injection molding, a decorative layer is formed on a surface of the base sheet not coated with the bonding layer.

In the decorative sheet according to the present invention for in-mold decorating injection molding, the decorative layer contains a binder resin, and at least either an acrylic resin contained in the binder resin or a polyvinyl chloride-acetate resin.

Since the base sheet, the decorative layer and the bonding layer are formed of specific resins, respectively, the adhesion between the component layers of the decorative sheet, as well as adhesion in a hot state, is satisfactory. The use of a transparent sheet as the base sheet gives an excellent coating effect.

In the decorative sheet according to the present invention for in-mold decorating injection molding, a primer layer is sandwiched between the decorative layer and the bonding layer.

In the decorative sheet according to the present invention for in-mold decorating injection molding, the primer layer contains either an acrylic resin or a polyvinyl chloride-acetate resin or both the acrylic resin and the polyvinyl chloride-acetate resin.

Adhesion between the decorative layer and the bonding layer can be enhanced by forming the primer layer of a specific resin between the decorative layer and the bonding layer, and the adhesion of the component layers of the decorative sheet for in-mold decorating injection molding in a hot state can be further ensured.

According to the present invention, a decorative molding comprises a decorative sheet for in-mold decorating injection molding having a base sheet and a resin layer formed on a surface of the base sheet containing an acrylic-modified polyolefin resin; and an injection-molded resin molding to which the resin layer containing an acrylic-modified polyolefin resin is bonded.

The adhesion between the decorative sheet for in-mold decorating injection molding and the resin molding in a hot state is satisfactory and the effects of the foregoing decorative sheets for in-mold decorating injection molding are available. Since adhesion between the component layers of the decorative molding in a hot state is high, the decorative molding can be applied to automotive interior furnishings. The resin molding may be formed of an inexpensive polyolefin resin, such as a polypropylene resin.

According to the present invention, an in-mold decorating injection molding method comprises the steps of: preparing a decorative sheet for in-mold decorating injection molding having a base sheet and a resin layer formed on a surface of the base sheet to be brought into contact with an injection-molded resin molding and containing an acrylic-modified polyolefin resin; inserting the decorative sheet in a space between a pair of molds in an open state; clamping the pair of molds; injecting an injection-molding resin into a cavity formed by the pair of molds so that the injection-molding resin comes into contact with the resin layer containing an acrylic-modified polyolefin resin; solidifying the injection-molding resin injected into the cavity in an injection-molded resin molding and adhesively bonding the decorative sheet for in-mold decorating injection molding to the surface of the injection-molded resin molding to form a decorative molding formed of the decorative sheet for in-mold decorating injection molding and the injection-molded resin molding; and parting the pair of molds and taking out the decorative molding from the pair of molds.

Since the decorative sheet for in-mold decorating injection molding is used for molding, a decorative molding having the injection-molded molding of an inexpensive polyolefin resin can be produced and the decorative sheet of the decorative molding has satisfactorily adhesion with the injection-molded resin molding in a hot state. The use of an acrylic resin sheet as the base sheet enables forming a decorative molding having an excellent coating effect.

DESCRIPTION OF THE PREFERRED EMBODIMENTS

Preferred embodiments of the present invention will be described with reference to the accompanying drawings. FIGS. 1(A), 1(B), 1(C) and 1(D) are sectional views of decorative sheets in preferred embodiments according to the present invention for in-mold decorating injection molding, FIG. 2 is a sectional view of a decorative molding in a preferred embodiment according to the present invention, and FIGS. 3(A) and 3(B) are typical views of assistance in explaining an in-mold decorating injection molding method in a preferred embodiment according to the present invention.

Decorative Sheets for In-Mold Decorating Injection Molding

A decorative sheet for in-mold decorating injection molding according to the present invention has a resin layer containing an acrylic-modified polyolefin resin to be brought into contact with an injection-molded resin molding. For example, a decorative sheet S for in-mold decorating injection molding shown in FIG. 1(A) has a base sheet 1, and a bonding layer 2 formed on a surface of the base sheet 1 to be brought into contact with an injection-molded resin molding. The bonding layer 2 contains an acrylic-modified polyolefin resin. Preferably, the acrylic-modified polyolefin resin is, for example, a resin composed by grafting-copolymerizing an acrylic monomer and/or an acrylic prepolymer to the principal chains of a polypropylene resin.

Figure 1:
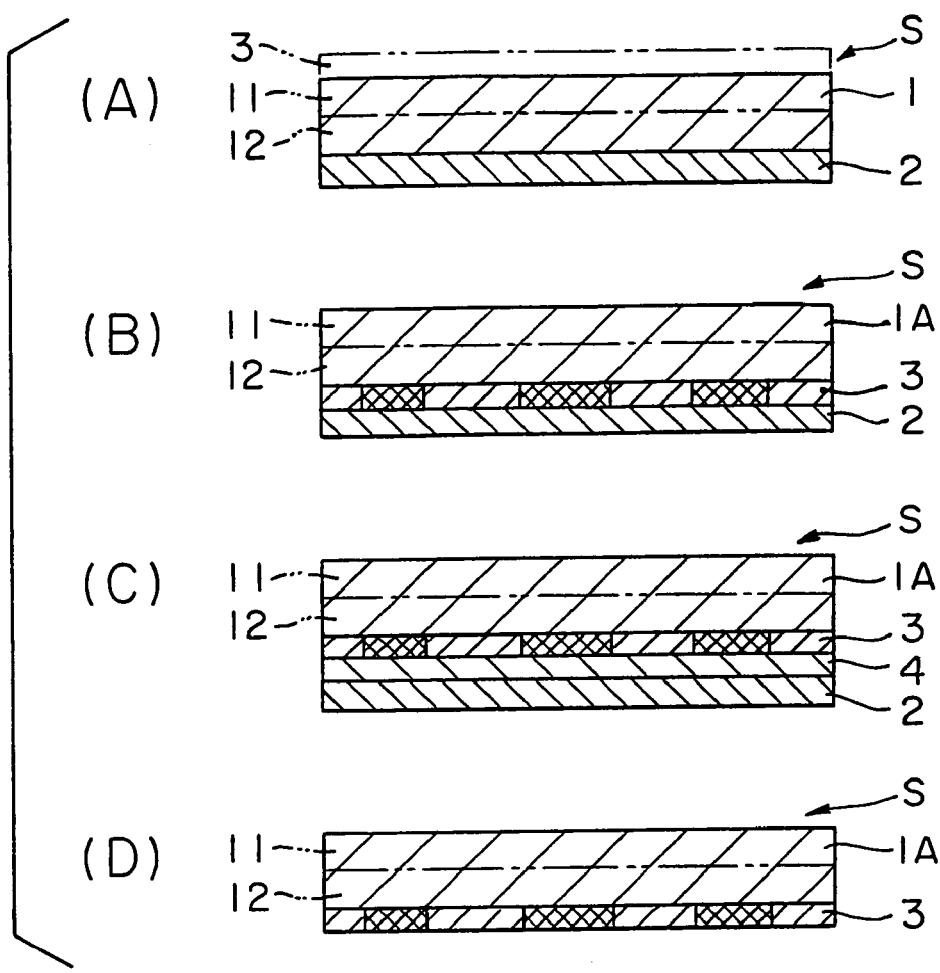
FIGS. 1(A), 1(B), 1(C) and 1(D) are sectional views of decorative sheets in preferred embodiments according to the present invention for in-mold decorating injection molding.
Figure 2:
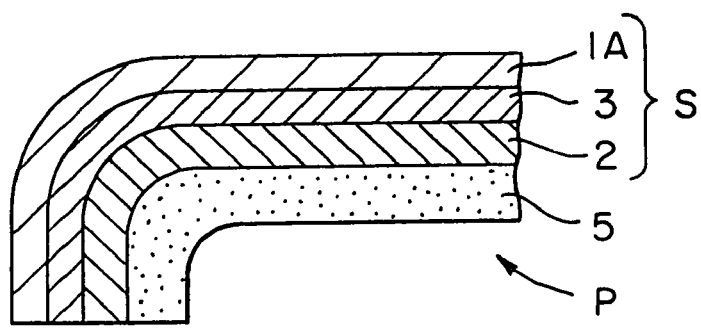
FIG. 2 is a sectional view of a decorative molding in a preferred embodiment according to the present invention.

FIGS. 1(B) and 1(C) show decorative sheets S for in-mold decorating injection molding in other embodiments according to the present invention. The decorative sheet S shown in FIG. 1(B) has a base sheet 1A of an acrylic resin, a decorative layer 3 of a material prepared by mixing a binder, i.e., a resin, and either an acrylic resin or a polyvinyl chloride-acetate resin or both the acrylic resin and the polyvinyl chloride-acetate resin and a bonding layer 2 containing an acrylic-modified polyolefin resin. The base sheet 1A, the decorative layer 3 and the bonding layer 2 are superposed in that order and are laminated. The decorative sheet S for in-mold decorating injection molding shown in FIG. 1(c) has, in addition to the layers of the decorative sheet shown in FIG. 1(B), a primer layer 4 sandwiched between the decorative layer 3 and the bonding layer 2 and containing either an acrylic resin or a polyvinyl chloride-acetate resin or both the acrylic resin and the polyvinyl chloride-acetate resin.

In the decorative sheets S shown in FIGS. 1(B) and 1(C), the base sheets 1A are transparent sheet through which the decorative layers 3 are visible.

The decorative sheets S shown in FIGS. 1(A) to 1(C) are only examples of decorative sheets for in-mold decorating injection molding according to the present invention and the present invention is not limited thereto in its practical application. For example, a decorative sheet S in a further embodiment according to the present invention shown in FIG. 1(D) has only a base sheet 1A and a decorative sheet 3 bonded to the back surface of the base sheet 1A, and the decorative layer 3 contains an acrylic-modified polyolefin resin as an ink binder.

Base Sheet

A moldable resin sheet is typical of the base sheet 1. When the decorative sheet is to be bonded to a flat part of a flat molding, moldability is not necessarily an essential property of the decorative sheet. When a molding to which the decorative sheet is to be bonded has an irregular surface and the decorative sheet is extended and bonded to the irregular surface by an in-mold decorating injection molding method, moldability is an essential property of the decorative sheet. When a layer to be seen, such as the decorative layer 3 is to be bonded to the inner surface, i.e., a surface facing the molding, of the base sheet 1, the base sheet 1 is formed of a transparent material. However, in a decorative sheet not having any decorative layer to be seen on the inner surface of the base sheet 1, or in a decorative sheet having the decorative layer 3 on the outer surface of the base sheet, the base sheet 1 may be an opaque sheet (colored or not colored).

Suitable materials for forming the base sheet 1 are, for example, polyolefin resins including polyethylene resins, polypropylene resins, polybutene resins, poly(methyl pentene) resins, ethylene-propylene copolymers, ethylene-propyl-ene-butene copolymers and thermoplastic olefin elastomers, polyester resins including polyethylene terephthalate resins, polybutylene terephthalate resins, ethylene terephthalate-isophthalate copolymers and thermoplastic polyester elastomers, polyamide resins including nylon, fluoride resin including polyvinyl fluoride or polyvinyliden fluoride, acrylic resins, vinyl chloride resins, ABS resins (acrylonitrile-butadiene-styrene copolymers), AS resins (acrylonitrile-styrene copolymers, polycarbonate resins, urethane resins and other thermoplastic elastomers. The base sheet 1 is a single-layer sheet of one of the foregoing resins or may be a laminated sheet having layers formed of different materials, respectively, such as the layers 11 and 12. A resin-impregnated sheet formed by impregnating a fabric, such as a nonwoven fabric or a woven fabric, with a resin or a laminated sheet formed by laminating the resin-impregnated sheet and a resin sheet may be used, provided that the resin-impregnated sheet or the laminated sheet has satisfactory moldability.

Acrylic resins suitable for forming the base sheet 1A include, for example, polymethyl (meth)acrylate resins, polymethyl (meth)acrylate resins, polybutyl (meth)acrylate resins, methyl (meth)acrylate-butyl (meth)acrylate copolymers, methyl (meth)acrylate-butyl (meth)acrylate copolymers, and methyl (meth)acrylate-styrene copolymers. In the foregoing designations of the acrylic resins, "(meth)acrylate" signifies an acrylate or a methacrylate. The base sheet 1A may be a single layer of one of those acrylic resins, a single layer of a mixture of some of those acrylic resins, a laminated sheet of the two layers 11 and 12 or a laminated sheet of three or more layers. The base sheet may be a transparent, colorless sheet or a transparent, colored sheet.

The base sheet 1A formed of a transparent acrylic resin has excellent clarity and an excellent coating effect. The base sheet 1A is satisfactory in weathering resistance and abrasion resistance.

When necessary, a lubricant, such as a polyethylene wax or a paraffin wax, particles of an antifriction material, such as silica, spherical α-alumina or flaky α-alumina, an ultraviolet absorber, such as benzotriazole, benzophenone or particulate cerium oxide, a light stabilizer, such as a hindered amine radical scavenger or additives such as a filler, such as particles of calcium carbonate, barium sulfate or aluminum oxide, a plasticizer, a stabilizer and a coloring material, may be may be added to the base sheets 1 and 1A for physical property adjustment. When the base sheet 1A is formed of an acrylic resin, the additives must be added to the acrylic resin so that the clarity of the base sheet 1A may not be spoiled.

Although there are not any particular conditions, the thickness of the base sheets 1 and 1A is generally in the range of about 30 to about 500 μm. For example, the thickness of the base sheet 1A of an acrylic resin is generally in the range of about 50 to about 250 μm. When the thickness of the base sheet in such a range, the bonding layer having high adhesion in a hot state is able to prevent the separation of the decorative sheet from a resin molding due to the effect of residual stress remaining in the base sheet after heating.

Bonding Layer

The bonding layer 2 is formed on a surface of the base sheet, facing the injection-molded resin molding. The bonding layer 2 contains an acrylic-modified polyolefin resin. A problem that the adhesion in a hot state (in in-mold decorating injection molding and in using products) of a bonding layer of a chlorinated polypropylene resin is not satisfactory can be solved by the bonding layer 2 containing the acrylic-modified polyolefin resin. Therefore, the decorative molding can be applied to uses that require heat resistance, such as automotive interior furnishings. The adhesion of the bonding layer 2 in a hot state is effective with resin moldings formed of polyolefin resins with which most decorative sheets have difficulty in adhering thereto.

Basically, there are not any particular conditions for the acrylic-modified polyolefin resin, provided that the acrylic-modified polyolefin resin is produced by modifying a polyolefin resin with an acrylic monomer (or an acrylic prepolymer produced by properly polymerizing the acrylic monomer). Preferably, the resin produced by grafting-copolymerizing at least an acrylic monomer and/or an acrylic prepolymer on the principal chains of a polypropylene resin is one of resins satisfactory in adhesion in a hot state, and coating and printing aptitude.

A monomer or a prepolymer of an organic material other than acrylic resins may be additionally grafting-copolymerized on the principal chains of the polypropylene resin for the adjustment of physical properties, such as heat resistance, and chlorine atoms may be added to the polypropylene resin in a content that will not reduce adhesion in a hot state.

Possible resins as the polyolefin resin of the acrylic-modified polyolefin resin include, for example, polypropylene resins, polyethylene resins, polybutene resins, polymethyl pentene resins, ethylene-propylene copolymers, ethylene-propylene-butene copolymers, ethylene-propylene-hexene copolymers.

Acrylic monomers suitable for modifying the polyolefin resin are alkyl (meth)acrylate monomers including methyl (meth)acrylate monomers, ethyl (meth)acrylate monomers, n-propyl (meth)acrylate monomers, isopropyl (meth)acrylate monomers, n-butyl (meth)acrylate monomers, isobutyl (meth)acrylate monomers, octyl (meth)acrylate monomers, ethylhexyl (meth)acrylate monomers, 2-hydroxyethyl (meth)acrylate monomers and 2-hydroxy-3-phenoxypropyl (meth)acryalte monomers. Possible acrylic prepolymers are copolymers including those of acrylic monomers and those of an acrylic monomer and a monomer other than the acrylic monomer.

The acrylic-modified polyolefin resin can be produced by, fore example, dissolving a polyolefin resin in a suitable solvent or making a polyolefin resin swell with a suitable solvent and adding a radical polymerization initiator, and an acrylic monomer or an acrylic prepolymer to the dissolved or swollen polyolefin resin to graft the monomers or the prepolymers on the principal chains of the polyolefin resin. The solvent may be, for example, a hydrocarbon, chlorobenzene, anisole, cyclohexane or naphtha. The radical polymerization initiator may be benzoyl peroxide, di-t-butyl peroxide or azobisisobutyronitrile.

The acrylic-modified polyolefin resin produced by modifying a polyolefin resin with an acrylic monomer or an acrylic prepolymer is soluble in an organic solvent, and has coating and printing aptitude. The acrylic-modified polyolefin resin is used in the form of a coating liquid or an ink. A layer of the acrylic-modified polyolefin resin is formed by a known coating or printing method when the acrylic-modified polyolefin resin is dissolved in an organic solvent or by other layer forming method, such as a melt coating method. The bonding layer may be formed by forming a resin film by a T-die extrusion method and bonding the resin film to the base sheet by a dry lamination method using an adhesive, such as a two-part urethane adhesive. A sheet of the acrylic-modified polyolefin resin may be used as the base sheet.

The thickness of the bonding layer may be in the range of about 0.5 to about 100 μm.

When necessary, auxiliary additives, such as calcium carbonate, barium sulfate and silica may be added to the material forming the bonding layer to adjust and improve physical properties including printing or coating aptitude of the material.

Decorative Layer

Typically, the decorative layer 3 has a picture of a pattern and characters. The picture may be of an optional pattern, such as the grain of wood, the grain of stone, the texture of a fabric, a matte pattern, a geometric pattern, characters or a solid pattern.

The decorative layer 3 may be, when the use desires, a metallic paper sheet formed by coating a resin sheet with aluminum or the like by a vapor deposition process. When the base sheet 1A is formed of an acrylic resin, it is preferable, in view of adhesion to the base sheet 1A or the bonding layer 2, to form the decorative sheet of a specific resin capable of serving as a binder. The specific resin contains, to secure satisfactory interlaminar adhesion, at least one of the acrylic-modified polyolefin resin and a polyvinyl chloride-acetate resin. These resins are used individually or in combination as a binder. The material forming the decorative layer 3 may contain resins other than the foregoing resins as additives for the adjustment of physical properties. Possible resins as additives are, for example, chlorinated polyolefin resins including thermoplastic polyester resins, thermoplastic urethane resins, chlorinated polyethylene resins and chlorinated polypropylene resins.

Usually, the decorative layer 3 is formed by a known printing method, such as a gravure printing method, or known coating method, such as a gravure coating method, using an ink or a coating material containing the foregoing resin as a binder, and a coloring material.

The acrylic resin may be, in addition to one of the foregoing materials previously mentioned in connection with the description of the base sheet, an acrylic polyol resin obtained through the copolymerization of one of alkylester (meth)acrylate resins including methyl (meth)acrylate resins, ethyl (meth)acrylate resins, butyl (meth)acrylate resins, 2-ethylhexyl (meth)acrylate resins and octyl (meth)acrylate resins, and one of ester (meth)acrylate resins having hydroxyl groups including 2-hydroxyethyl (meth)acrylate resins, 2-hydroxybutyl (meth)acrylate resins and 2-hydroxy-3-phenoxypropyl (meth)acrylate resins.

The polyvinyl chloride-acetate resin has a vinyl acetate content in the range of about 5 to about 20% by weight and a mean polymerization degree in the range of about 350 to about 900. The polyvinyl chloride-acetate resin may be a polyvinyl chloride-acetate resin (bipolymer) or, when necessary, a terpolymer produced through the copolymerization of a polyvinyl chloride-acetate resin and a carboxylic acid, such as maleic acid, fumaric acid or (meth)acrylic acid, may be used. When a mixture of an acrylic resin and a polyvinyl chloride-acetate resin is used, the acrylic resin/polyvinyl chloride-acetate resin mixing ratio is in the range of about 1/9 to about 9/1 (weight ratio).

If the decorative layer containing the acrylic-modified polyolefin resin as a binder is a solid layer, the same may be used also as a bonding layer.

The coloring material is, for example, an inorganic pigment, such as titanium white, zinc white, carbon black, iron black, red iron oxide, cadmium red, ultramarine, cobalt blue, chrome yellow or titanium yellow, an organic pigment, such as phthalocyanine blue, indanthrene blue, isoindolinion yellow, quinacridon red or perylene red, a metallic pigment, such as aluminum powder, brass powder, flakes of aluminum or flakes of brass, a nacreous pigment (pearlescent pigment), such as mica powder or flakes coated with titanium oxide, or a dye.

In most cases, the decorative layer 3 is formed on the inner surface (the surface facing the resin molding) of the base sheet 1A as shown in FIGS. 1(B) and 1(C). However, the decorative sheet 3 may be formed on the outer surface (the surface not facing the resin molding) of the base sheets 1A and 1. For example, the decorative layer 3 may be formed on the outer surface of the base sheet 1 of the decorative sheet S shown in FIG. A.

Primer Layer

Although not indispensable, it is preferable to form the primer layer 4 between the decorative layer 3 and the bonding layer 2 as shown in FIG. 1(C) when it is desired to enhance the adhesion between the decorative layer 3 and the bonding layer 2. It is preferable to provide the decorative sheet S with the primer layer 4, for example, when importance is attached to adhesion with the resin molding in selecting the acrylic-modified polyolefin resin forming the bonding layer and adhesion between the decorative layer and the bonding layer is insufficient. Basically, there are not any particular conditions for a resin for forming the primer layer 4; a proper resin for forming the primer layer 4 may be selected taking into consideration the properties of the decorative layer and the bonding layer. For example, the primer layer 4 is formed of a urethane resin or any other suitable resin. When the decorative layer is formed of the specific resin as mentioned above, it is preferable in respect of interlaminar adhesion to use one or some of acrylic resins, the aforesaid acrylic-modified polyolefin resins, the aforesaid polyvinyl chloride-acetate resins. Those resins are the same as the specific resins for forming the decorative layer and hence the further description thereof will be omitted.

The primer layer may be formed of an ink or a coating liquid of the aforesaid resin by a known printing or coating method. The thickness of the primer layer is in the range of about 1 to about 10 μm.

Although the primer layer 4 is a easy-to-bond layer and, when necessary, the primer layer 4 may be formed between other layers, for example, between the base sheet and the decorative layer. The primer layer may be formed of the aforesaid specific resin or other resin suitable for use in combination with the adjacent layers.

Decorative Molding

A decorative molding according to the present invention is formed by bonding the decorative sheet for in-mold decorating injection molding to a molding of a polyolefin resin by a bonding layer containing an acrylic-modified polyolefin resin. It is desirable to form the molding of a polyolefin resin to ensure high adhesion in a hot state between the component layers of the decorative sheet for in-mold decorating injection molding.

FIG. 2 shows a decorative molding P in a preferred embodiment according to the present invention in a sectional view. The decorative molding P has a resin molding 5 formed of a polyolefin resin, and a decorative sheet S for in-mold decorating injection molding including a bonding layer 2 containing an acrylic-modified polyolefin resin, a decorative layer of a mixture of a binder and at least either an acrylic resin or a polyvinyl chloride-acetate resin, and a base sheet 1A of an acrylic resin. The decorative sheet S comprising the bonding layer 2, the decorative layer 3 and the base sheet 1A is bonded to the resin molding 5 by an in-mold decorating injection molding method.

Possible polyolefin resins for forming the resin molding 5 are, for example, polyethylene resins, polypropylene resins, polybutene resins, poly(methyl pentene)resins, ethylene-propylene copolymers, ethylen-propylne-butene terpolymers, thermoplastic olefin elastomers, and mixtures of thermoplastic olefin elastomers.

It is desirable to add an ethylene-propylene rubber (EPR) to the polyolefin resin forming the molding 5 to enhance adhesion between the decorative sheet S and the molding 5. The ethylene-propylene rubber is an ethylene-propylene copolymer, which is an amorphous random copolymer. The EPR may be a pure ethylene-propylene copolymer or an ethylene-propylene-diene terpolymer (EPDM). It is preferable, in view of adhesion improvement and rigidity maintenance, to add 1 to 40 parts by weight of EPR to 100 parts by weight of the polyolefin resin. Acrylic resins, as well as polyolefin resins, may be used for forming the resin molding.

A coloring material may be added to the resin for injection molding to use a colored resin meeting a use. The known coloring materials previously mentioned in connection with the description of the materials for the decorative layer may be used. Some of various known additives including powder of inorganic materials, such as silica, alumina, calcium carbonate and aluminum hydroxide, fillers, such as glass fibers, stabilizers and lubricants, are added to the resin for injection molding as the occasion demands.

Usually, the decorative molding P is a solid body having a nonflat surface to which the decorative sheet S is bonded. The decorative molding P according to the present invention may be a solid body having a flat surface to which the decorative sheet S is bonded and other nonflat surfaces, and a plate-shaped body having a flat surface to which the decorative sheet S is bonded.

The use of the decorative sheet S for in-mold decorating injection molding according to the present invention is an essential condition for forming the decorative molding P according to the present invention. The decorative sheet S for in-mold decorating injection molding is bonded to the resin molding 5 by an in-mold decorating injection molding method, which will be described later. However, the method of forming the decorative molding according to the present invention is not necessarily limited to the in-mold decorating injection molding method. Any proper molding method may be used depending on the shape of a surface of a resin molding to which the decorative sheet is to be bonded and available manufacturing equipment. For example, a vacuum forming and bonding method, such as an overlay method disclosed in JP-B No. Sho 56-45768 or a vacuum pressing method disclosed in JP-B No. Sho 60-58014, may be used. Naturally, it is preferable to use the in-mold decorating injection molding method according to the present invention because the in-mold decorating injection molding method according to the present invention achieves molding and decorating simultaneously and produces decorative moldings efficiently.

In-Mold Decorating Injection Molding Method

The in-mold decorating injection molding method according to the present invention bonds the aforesaid decorative sheet for in-mold decorating injection molding to a molding to produce a decorative molding decorated by the decorative sheet.

As mentioned in JP-B Nos. Sho 50-19132 and Sho 43-27488, in the in-mold decorating injection molding method, a decorative sheet for in-mold decorating injection molding is inserted into in a cavity defined by male and female molds for injection molding and a molten resin is injected into the cavity to bond the decorative sheet to a resin molding while the resin molding is being molded to form a decorative molding.

The in-mold decorating injection molding method according to the present invention is similar to generally known in-mold decorating injection molding methods, except that the former uses the decorative sheet S according to the present invention. For example, the decorative sheet S may be either preformed or not preformed, and the decorative sheet S may be either preheated or not preheated. Usually, the decorative sheet is preheated when the same is preformed.

Naturally, it is preferable to preform the decorative sheet S when the decorative sheet is to be drawn greatly. When the decorative sheet S is to be drawn slightly, the decorative sheet S may be formed only by the pressure of the molten resin injected into the cavity. When the decorative sheet S is to be drawn lightly, the decorative sheet S may be formed by the pressure of the molten resin injected into the cavity without preforming the same. In some cases, the decorative sheet S is not preheated and is the heat of the molten resin injected into the cavity is used for heating the decorative sheet S when the decorative sheet S is formed by the pressure of the molten resin. Usually, the injection mold is used also as a vacuum forming mold for preforming the decorative sheet S. The decorative sheet S may be preformed by vacuum forming for off-line preforming before inserting the same in the injection mold. The use of the injection mold also as a vacuum forming mold for preforming is preferable because the decorative sheet S preformed by using the injection mold can be efficiently and accurately bonded to the resin molding. When preformed decorative sheets S are manufactured beforehand by a special process, it is preferable to preform the decorative sheets S in an off-line vacuum forming mode. In the description of the present invention, the term "vacuum forming" signifies also vacuum/pressure forming.

Figure 3:
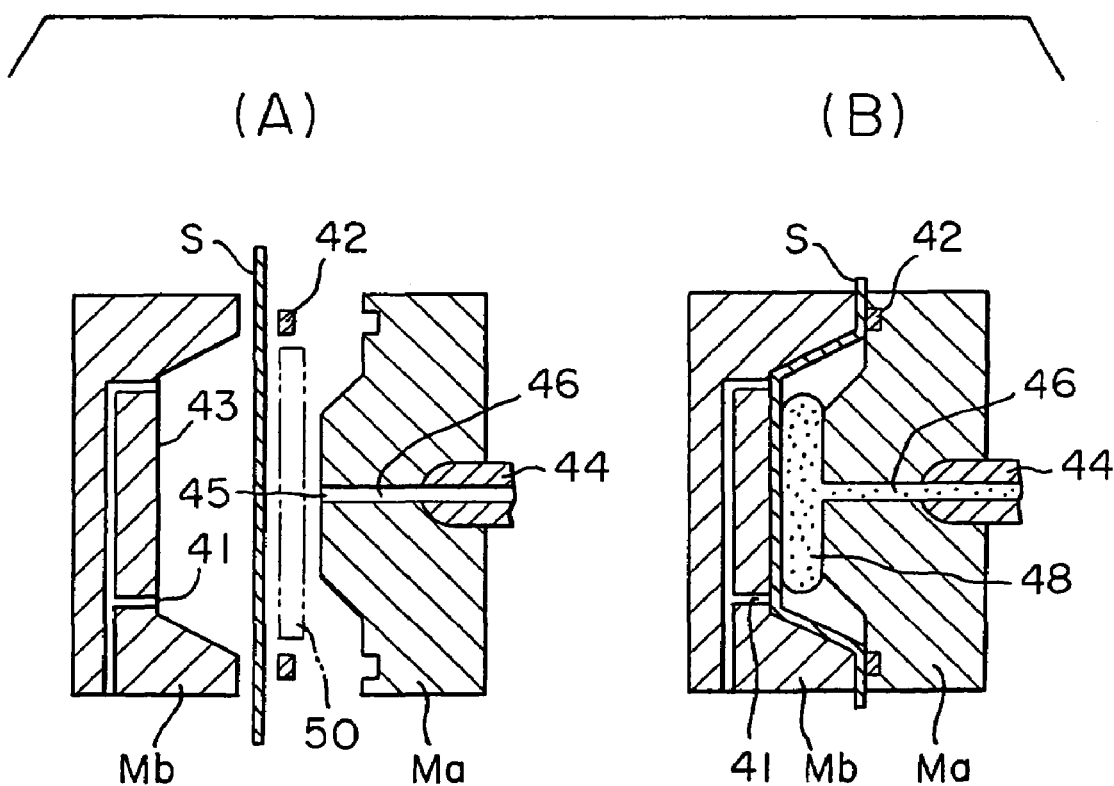
FIGS. 3(A) and 3(B) are typical views of assistance in explaining an in-mold decorating injection molding method in a preferred embodiment according to the present invention.

An in-mold decorating injection molding method in a preferred embodiment according to the present invention will be described with reference to FIG. 3. This in-mold decorating injection molding method preforms a decorative sheet for in-mold decorating injection molding by heating and softening the decorative sheet in an injection mold and vacuum-forming the same by the injection mold, closes the injection mold and then injects a molten resin into the injection mold. This in-mold decorating injection molding method is suitable for in-mold decorating injection molding in which a decorative sheet is drawn greatly.

Naturally, a decorative sheet to be used by the in-mold decorating injection molding method according to the present invention may be supplied in separate decorative sheets or in a continuous web of a plurality of decorative sheets.

Referring to FIG. 3(A), an injection mold is a two-plate mold having a male mold Ma provided with a runner 46 to be connected to an injection nozzle 44, and a gate 45, and a female mold Mb having an inner surface 43 defining a cavity, provided with suction holes 41 opening into the cavity, and serving also as a preforming mold. The molds Ma and Mb are formed of a metal, such as iron, or a ceramic material. The injection mold is opened, a decorative sheet S is inserted in a space between the molds Ma and Mb, and then the decorative sheet S is pressed against and held on the female mold Mb by a clamp frame 42. Thus, the decorative sheet S is held in place with its bonding layer containing an acrylic-modified polyolefin resin facing the cavity into which a molten resin is injected. The decorative sheet S is heated and softened by heating the same by a heater 50 inserted in the space between the molds Ma and Mb. The decorative sheet S may be heated by either radiant heating, i.e., noncontact heating, or conduction heating, i.e., contact heating. Air is sucked through the suction holes 41 to attract the decorative sheet S to the inner surface of the female mold Mb so as to conform to the shape of the inner surface of the female mold Mb for vacuum preforming. Then, the heater 50 is retracted from the space between the molds Ma and Mb, the molds Ma and Mb are clamped together as shown in FIG. 3(B), and then a fluidic, molten resin 48 is injected into the cavity defined by the molds Ma and Mb so as to fill up the cavity. After the resin 48 injected into the cavity has cooled down and solidified in a resin molding 5, the molds Ma and Mb are parted and a decorative molding P thus molded is removed from the injection mold.

Then, the decorative sheet S is trimmed to remove unnecessary parts thereof to finish the decorative molding P formed by bonding the decorative sheet S to the resin molding 5.

Injection Molding Resin

Basically, there are not any particular conditions for resins to be used by the in-mold decorating injection molding method according to the present invention and the in-mold decorating injection molding method may use any known resins. A suitable resin meeting the required physical properties and cost of products may be used. Possible thermoplastic resins include ABS resins (acrylonitrile butadiene styrene resins), styrene resins, acrylic resins, vinyl chloride resins, polycarbonate resins and polyolefin resins. Possible hardening resins include two-part hardening resins, such as uncured liquid resins, such as urethane resins, unsaturated polyester resins and epoxy resins. A thermoplastic resin is heated and melted in a molten resin, and the molten resin is injected into an injection mold. An uncured hardening resin is heated at a proper temperature, such as a room temperature, and the liquid, uncured hardening resin is injected into an injection mold. The decorative sheet S for in-mold decorating injection molding according to the present invention has high adhesion particularly with a polyolefin resin molding. Therefore, the injection molding resin 48 is one of the polyolefin resins mentioned above in connection with the foregoing description of the decorative molding and hence the further description thereof will be omitted.

The term "decoration" as used in this specification signifies not only simply forming visible patterns including pictures, characters and/or figures on a molding but also forming invisible patterns and/or a functional layer, such as a hard coating film, a conducting layer or a magnetic layer, on a molding. Visible patterns include printed pattern layers and metal thin films formed by vacuum deposition. Invisible patterns include patterns formed by printing using a fluorescent ink that is transparent to visible light and emits fluorescent light when irradiated with ultraviolet rays, or bar codes or identification marks formed by printing using infrared absorption ink or magnetic ink.

EXAMPLES

Examples of the present invention and comparative examples will be described hereinafter.

Example 1

A base sheet 1A of a 125 μm thick transparent sheet of an acrylic resin (mixed resin of a polymethyl methacrylate resin and a polybutyl methacrylate resin, having a glass transition point of 105° C.) was prepared. A decorative sheet S for in-mold decorating injection molding as shown in FIG. 1(B) was formed by forming a multicolor decorative layer 3 (including a solid layer) of a wood grain pattern and a 3 μm thick adhesive layer (the bonding layer) 2 in that order on one surface of the base sheet 1A by gravure printing.

The decorative layer 3 contains, as a binder, a mixed resin containing a polyvinyl chloride-acetate resin and an acrylic resin in a weight ratio of 1/1. Color inks containing red iron oxide and carbon black as principal components were used as coloring materials. An ink was prepared by dissolving an acrylic-modified polyolefin resin containing an alkyl ester methacrylate resin as an acrylic component and a polypropylene resin as an olefin component, and obtained by grafting-copolymerizing the acrylic component to the principal chains of a polymer of the olefin component in a mixed solvent prepared by mixing toluene and methyl ethyl ketone in a weight ratio of 1/1. The bonding layer 2 was formed by using this ink.

A resin molding 5 was molded and the decorative sheet S was bonded to the surface of the resin molding 5 by the in-mold decorating injection molding method previously described in connection with FIG. 3 to obtain a decorative molding P according to the present invention.

In the in-mold decorating injection molding method, the female mold Mb was used as a vacuum forming mold, the decorative sheet S was inserted in a space between the molds Ma and Mb, and the decorative sheet S was heated and softened by heating the same by the heater 50 for preforming. The molds Ma and Mb were designed to form the resin molding 5 in the shape of a box. The female mold Mb was provided with the suction holes 41 for preforming. The decorative sheet S was heated for preforming at 110° C. The injection molding resin 48 was heated at 230° C. A polypropylene resin of the coating grade for automotive interior furnishings was used as the injection molding resin 48. This polypropylene resin contains 10% by weight EPR and 20% by weight talc powder.

Comparative Example 1

A decorative layer 3 similar to that of Example 1 was formed on a base sheet 1A similar to that of Example 1. A 0.75 μm thick primer layer 4 was formed on the decorative layer 3 by gravure printing using a two-part urethane resin ink prepared by mixing hexamethylene-1,6-diisocyanate and acrylpolyol. Then, a 3 μm thick bonding layer 2 was formed on the primer layer 4 by gravure printing using an ink prepared by mixing a chlorinated polypropylene resin, a petroleum resin and an epoxy resin to obtain a decorative sheet S for in-mold decorating injection molding. A decorative sheet P provided with the decorative sheet S was formed by an in-mold injection molding method similar to that employed in forming the decorative sheet P in Example 1.

Comparative Example 2

A decorative sheet S in Comparative example 2 was formed. The decorative sheet S in Comparative example 2 was similar to that in Comparative example 1, except that the decorative sheet S in Comparative example 2 was provided with a primer layer 4 formed of a two-part urethane resin prepared by mixing a polyurethane elastomer having a polycarbonate skeleton as a principal component and hexamethylene-1,6-diisocyanate (HMDI) containing trimethylolpropane (TPM) as a curing agent. A decorative molding P in Comparative example 2 was formed by an in-mold decorating injection molding method similar to that by which the decorative molding P in Comparative example 1 was formed.

Comparative Example 3

A decorative sheet S in Comparative example 3 was formed. The decorative sheet S in Comparative example 3 was similar to that in Comparative example 2, except that the decorative sheet S in Comparative example 3 was provided with a bonding layer 2 formed of a mixed resin prepared by mixing a chlorinated polypropylene resin and a urethane resin. A decorative molding P in Comparative example 3 was formed by an in-mold decorating injection molding method similar to that by which the decorative molding P in Comparative example 1 was formed.

Performance Evaluation

The performance of the decorative moldings P were evaluated in terms of adhesion at an ordinary temperature, adhesion immediately after molding (adhesion during molding) and heat resistance. Results of evaluation are tabulated in Table 1.

Test Methods (1) Adhesion at Ordinary Temperature

Adhesion was tested by the cross-cut tape test method (K5400-1990, JIS). In cross-cut tape tests, incisions were formed with a knife in a check pattern at longitudinal and lateral pitches of 1 mm in the decorative sheet S in a depth reaching the surface of the resin molding 5 to divide the decorative sheet S into 100×100=100 sections. A 24 mm wide adhesive cellophane tape (Serotepu®, Industrial tape, Nichiban K.K.) was applied to the incised decorative sheet S, and then, the adhesive cellophane tape was peeled off rapidly. The number of the sections of the decorative sheet S peeled off the resin molding was counted. When none of the sections of the decorative sheet S was peeled off and all the sections remained intact (Intactness ratio=100/100), the adhesion of the decorative sheet S was rated as sufficient. When even one of the sections of the decorative sheet S was peeled off and the rest remained intact (Intactness ratio=99/100), the adhesion of the decorative sheet S was rated as insufficient.

(2) Adhesion Immediately After Molding

The cross-cut tape test method takes time for incising the decorative sheet S in a check pattern. The temperature of the sample decorative molding P drops while the decorative sheet S is being incised. Adhesion immediately after molding that indicates adhesion in a hot state is evaluated by a cross-cut test method. The cross-cut test method forms two incisions intersecting each other at an angle of 30° with a knife in the decorative sheet S coating the surface of the decorative molding P in a depth reaching the surface of the resin molding 5 and tries to peel the decorative sheet S from the intersection of the incisions. The adhesion of the decorative sheet S was rated as sufficient when the decorative sheet S was broken and only a part of the decorative sheet around the intersection of the incision was peeled and the rest remained intact. The adhesion of the decorative sheet S was rated as insufficient when parts of the decorative sheet S other than that around the intersection of the incisions were peeled.

(3) Heat Resistance

The decorative molding P was kept at 90° C., 100° C. and 110° C. for 1000 hr to evaluate the heat resistance of the decorative molding P. The heat resistance of the decorative molding P was evaluated in terms of the following four conditions (A) to (D).

(A) The heat resistance of the color of the decorative molding P was rated as satisfactory when the difference in the surface color of the decorative molding P was not greater than gray scale 4 (JIS) and was rated as unsatisfactory when the difference was greater than gray scale 4 (JIS).

(B) The adhesion of the decorative sheet S was rated as sufficient when edge parts of the decorative sheet S did not peel off and was rated as insufficient when edge parts peeled off.

(C) The surface of the decorative molding P was rated as satisfactory when visually recognizable orange peel or sinks along patterns were not formed and was rated as unsatisfactory when the same were formed.

(D) Adhesion of the decorative sheet S was evaluated by the cross-cut tape test method after cooling the decorative molding P to an ordinary temperature (23° C.). The adhesion was rated as sufficient when the intactness ratio was 100/100 and was rated as insufficient when the intactness ratio was 99/100 r below.

TABLE 1

| | Adhesion Evaluation | | | | |
|---|---|---|---|---|---|
| | Adhesion at ordinary temperature | Adhesion immediately after molding | Heat resistance (100 hr test) | | |
| | | | 90° C. | 100° C. | 110° C. |
| Example 1 | ○ | ○ | ○ | ○ | ○ |
| Comparative example 1 | ○ | X (Dissatisfactory in adhesion) | X (Occurrence in peeling off) | X (Occurrence in peeling off) | X (Occurrence in peeling off) |
| Comparative example 2 | ○ | X (Dissatisfactory in adhesion) | ○ | ○ | X (Occurrence in peeling off) |
| Comparative example 3 | ○ | X (Dissatisfactory in adhesion) | ○ | X (Occurrence in peeling off) | X (Occurrence in peeling off) |

Note:
Blank circles indicate 'satisfactory' or 'sufficient' and crosses indicate 'unsatisfactory' or 'insufficient'.

As obvious from Table 1, Example 1 is satisfactory in adhesion required of the decorative sheet S at an ordinary temperature, adhesion required of the decorative sheet S immediately after molding, i.e., adhesion required of the decorative sheet S during molding, and the heat resistance of the decorative molding P. The adhesion at an ordinary temperature of the decorative sheets S of Comparative examples 1, 2 and 3 is sufficient, but the same is insufficient in a hot state during molding and immediately after molding. In heat resistance, the decorative molding P in Comparative example 1 is unsatisfactory at temperatures not lower than 90° C., the decorative molding P in Comparative example 3 is unsatisfactory at temperatures not lower than 100° C., and the decorative molding P in Comparative example 2 is unsatisfactory at temperatures not lower than 110° C. Although all the decorative moldings P in Comparative examples 1, 2 and 3 are unsatisfactory in heat resistance in respect of the condition (B) (Peeling off of edge parts), the same are satisfactory in respect of the conditions (A), (C) and (D).

(1) The decorative sheet S for in-mold decorating injection molding according to the present invention has satisfactorily adhesion with the resin molding 5 of an inexpensive polyolefin resin in a hot state, i.e., in in-mold decorating injection molding, and in a state after molding, while most conventional decorative sheets have had difficulty in adhering to the resin molding 5.

(2) When the acrylic-modified polyolefin resin of the decorative sheet S is a resin composed by grafting-copolymerizing an acrylic monomer or an acrylic prepolymer on the principal chains of a polypropylene resin, adhesion in a hot state can be further ensured when the injection-molded molding is formed of a polyolefin resin, such as a polypropylene resin.

(3) When the decorative sheet S is formed by superposing the base sheet 1A of an acrylic resin, the decorative layer 3 of a specific binder resin and the bonding layer 2 containing an acrylic-modified polyolefin resin in that order and laminating the same, the decorative sheet S has satisfactory adhesion in a hot state, satisfactory adhesion between the component layers 1A, 2 and 3. When the base sheet 1A is formed of a transparent material, the decorative sheet S gives the decorative molding P excellent coating appearance.

(4) When the primer layer 4 of a specific rein is interposed between the bonding layer 2 and the decorative layer 3, adhesion between the bonding layer 2 and the decorative layer 3 is further ensured and the adhesion in a hot state of the decorative sheet S for in-mold decorating injection molding can be further ensured.

(5) In the decorative molding P according to the present invention, the adhesion in a hot state between the resin molding 5 of an inexpensive polyolefin resin and the decorative sheet S is satisfactory, while most conventional decorative sheets have had difficulty in adhering to the resin molding. Therefore, the decorative molding P is applicable to an automotive interior furnishing which must be heat-resistant. The resin molding 5 can be formed of an inexpensive polyolefin resin, such as a polypropylene resin.

(6) The in-mold decorating injection molding method according to the present invention using the decorative sheet S for in-mold decorating injection molding is able to produce the decorative molding P provided with the decorative sheet S bonded in satisfactory adhesion to the resin molding 5 even if the resin molding 5 is a molding formed of an inexpensive polyolefin resin, while most conventional decorative sheets have had difficulty in adhering to the resin molding. When the base sheet 1A is formed of an acrylic resin, the decorative sheet S gives the decorative molding P excellent coating appearance.

What is claimed is:

1. An in-mold decorating injection molding method for injection molding a decorative molding comprising the steps of:
preparing a decorative sheet for in-mold decorating injection molding including a base sheet and a resin layer formed on a surface of the base sheet to be brought into contact with an injection-molded resin molding and containing an acrylic-modified polyolefin resin;
inserting the decorative sheet in a space between a pair of molds in an open state;
clamping the pair of molds;
injecting an injection-molding resin into a cavity formed by the pair of molds so that the injection-molding resin comes into contact with the resin layer containing an acrylic-modified polyolefin resin;
solidifying the injection-molding resin injected into the cavity in an injection-molded resin molding and adhesively bonding the decorative sheet for in-mold decorating injection molding to a surface of the injection-molded resin molding to form a decorative molding formed of the decorative sheet for in-mold decorating injection molding and the injection-molded resin molding; and
parting the pair of molds and taking out the decorative molding from the pair of molds,
wherein the decorative molding comprises:
the decorative sheet for in-mold decorating injection molding, the decorative sheet comprising the base sheet having a first surface and a second surface, the decorative layer formed on the first surface, and the resin layer formed on the second surface; and
the injection-molded resin molding to which the resin layer is bonded;
wherein:

the decorative layer comprises a binder resin, the binder resin comprising at least one of an acrylic resin and a polyvinyl chloride-acetate resin;

the resin layer comprises an acrylic-modified polyolefin resin formed by graft-copolymerizing at least one of an acrylic monomer and an acrylic prepolymer on principal chains of a polypropylene resin.

2. The in-mold decorating injection molding method according to claim 1, wherein the injection-molding resin is a polyolefin resin.

3. An in-mold decorating injection molding method for injection molding a decorative molding comprising the steps of:

preparing a decorative sheet for in-mold decorating injection molding including a base sheet and a resin layer formed on a surface of the base sheet to be brought into contact with an injection-molded resin molding and containing an acrylic-modified polyolefin resin;

inserting the decorative sheet in a space between a pair of molds in an open state;

clamping the pair of molds;

injecting an injection-molding resin into a cavity formed by the pair of molds so that the injection-molding resin comes into contact with the resin layer containing an acrylic-modified polyolefin resin;

solidifying the injection-molding resin injected into the cavity in an injection-molded resin molding and adhesively bonding the decorative sheet for in-mold decorating injection molding to a surface of the injection-molded resin molding to form a decorative molding formed of the decorative sheet for in-mold decorating injection molding and the injection-molded resin molding; and parting the pair of molds and taking out the decorative molding from the pair of molds, wherein the decorative molding comprises:

the decorative sheet for in-mold decorating injection molding, the decorative sheet comprising the base sheet, the decorative layer formed on the base sheet, a primer layer formed on the decorative layer, and the resin layer formed on the primer layer; and the injection-molded resin molding to which the resin layer is bonded;

wherein:

the decorative layer comprises a binder resin, the binder resin comprising at least one of an acrylic resin and a polyvinyl chloride-acetate resin;

the resin layer comprises an acrylic-modified polyolefin resin formed by graft-copolymerizing at least one of an acrylic monomer and an acrylic prepolymer on principal chains of a polypropylene resin.

4. The in-mold decorating injection molding method according to claim 3, wherein the injection-molding resin is a polyolefin resin.

5. An in-mold decorating injection molding method for injection molding a decorative molding comprising the steps of:

preparing a decorative sheet for in-mold decorating injection molding including a base sheet and a resin layer formed on a surface of the base sheet to be brought into contact with an injection-molded resin molding and containing an acrylic-modified polyolefin resin;

inserting the decorative sheet in a space between a pair of molds in an open state;

clamping the pair of molds;

injecting an injection-molding resin into a cavity formed by the pair of molds so that the injection-molding resin comes into contact with the resin layer containing an acrylic-modified polyolefin resin;

solidifying the injection-molding resin injected into the cavity in an injection-molded resin molding and adhesively bonding the decorative sheet for in-mold decorating injection molding to a surface of the injection-molded resin molding to form a decorative molding formed of the decorative sheet for in-mold decorating injection molding and the injection-molded resin molding; and parting the pair of molds and taking out the decorative molding from the pair of molds, wherein the decorative molding comprises:

the decorative sheet for in-mold decorating injection molding, the decorative sheet comprising the base sheet, the decorative layer formed on the base sheet, and the resin layer formed on the decorative layer; and the injection-molded resin molding to which the resin layer is bonded;

wherein:

the base sheet is a laminated sheet having at least two layers;

the decorative layer comprises a binder resin, the binder resin comprising at least one of an acrylic resin and a polyvinyl chloride-acetate resin; and the resin layer comprises an acrylic-modified polyolefin resin formed by graft-copolymerizing at least one of an acrylic monomer and an acrylic prepolymer on principal chains of a polypropylene resin.

6. The in-mold decorating injection molding method according to claim 5, wherein the injection-molding resin is a polyolefin resin.

* * * * *